United States Patent
Grady et al.

(10) Patent No.: US 12,321,207 B2
(45) Date of Patent: Jun. 3, 2025

(54) DRIVE CARRIER WITH IN-MOLDED SCREW PLATE

(71) Applicant: HEWLETT PACKARD ENTERPRISE DEVELOPMENT LP, Spring, TX (US)

(72) Inventors: John R. Grady, Cypress, TX (US); Kevin Frank Labbe, Tomball, TX (US); Keith Allen Sauer, Spring, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 279 days.

(21) Appl. No.: 18/160,538

(22) Filed: Jan. 27, 2023

(65) Prior Publication Data

US 2024/0256007 A1 Aug. 1, 2024

(51) Int. Cl.
  *G06F 1/18* (2006.01)
  *G11B 33/12* (2006.01)
(52) U.S. Cl.
  CPC ............ *G06F 1/187* (2013.01); *G11B 33/124* (2013.01)
(58) Field of Classification Search
  CPC .................................................... G06F 1/187
  USPC ................................................... 361/679.33
  See application file for complete search history.

(56) References Cited

U.S. PATENT DOCUMENTS

| | | | | |
|---|---|---|---|---|
| 4,964,017 A * | 10/1990 | Jindrick | ................ | H05K 7/1429 361/818 |
| 5,801,920 A * | 9/1998 | Lee | ....................... | G11B 33/128 |
| 6,122,165 A * | 9/2000 | Schmitt | ................ | G11B 33/022 |
| 6,378,832 B1 * | 4/2002 | Li | ........................ | F16F 1/3849 267/141.5 |
| 6,396,686 B1 * | 5/2002 | Liu | ...................... | G11B 33/124 248/65 |
| 6,556,438 B1 * | 4/2003 | Bolognia | .................. | G06F 1/20 361/679.48 |
| 7,542,280 B2 * | 6/2009 | Hong | ..................... | G11B 33/12 361/679.33 |
| 7,639,490 B2 * | 12/2009 | Qin | ....................... | G06F 1/187 361/679.34 |
| 7,684,182 B2 * | 3/2010 | Zhang | ..................... | G06F 1/187 360/264.2 |
| 7,701,707 B2 * | 4/2010 | Peng | .................... | G11B 33/124 248/618 |

(Continued)

OTHER PUBLICATIONS

Unknown, Jul. 23, 2022, PennEngineering, https://www.pemnet.com/products/engineering-guides/si-threaded-inserts-for-plastic/.*

*Primary Examiner* — Adrian S Wilson
(74) *Attorney, Agent, or Firm* — Jones Robb PLLC

(57) ABSTRACT

A drive carrier comprises a front portion, a first lateral rail extending from the front portion, and a second lateral rail extending from the front portion. The front portion and first and second lateral rails form a frame configured to receive a media drive between the first and second lateral rails. The first lateral rail is formed from plastic and comprises a screw hole. When the media drive is received in the frame, the media drive is coupled to the first lateral rail by a screw inserted through the screw hole. The drive carrier also has a metal screw plate in-molded into the plastic of the first lateral rail surrounding the screw hole. The screw plate strengthens the first lateral rail around the rim of the screw hole to prevent the head of the screw from cracking the plastic and/or tearing through the plastic.

17 Claims, 11 Drawing Sheets

(56) References Cited

U.S. PATENT DOCUMENTS

| | | | | |
|---|---|---|---|---|
| 7,729,110 B2* | 6/2010 | Zhang | G11B 33/121 | 248/633 |
| 7,855,880 B2* | 12/2010 | Moore | G11B 33/1446 | 427/430.1 |
| 7,911,778 B2* | 3/2011 | Merrow | G11B 33/08 | 439/60 |
| 8,004,830 B2* | 8/2011 | Lu | G11B 33/123 | 361/679.33 |
| 8,248,778 B2* | 8/2012 | Dai | G11B 33/124 | 248/220.21 |
| 8,305,751 B2* | 11/2012 | Merrow | G11B 33/08 | 439/60 |
| 8,432,681 B2* | 4/2013 | Tung-Ke | G11B 33/124 | 361/679.33 |
| 8,456,832 B1* | 6/2013 | Brigham, Jr. | G11B 33/124 | 361/679.33 |
| 8,480,039 B2* | 7/2013 | Chang | G11B 33/124 | 361/679.33 |
| 8,582,300 B2* | 11/2013 | Liang | G06F 1/187 | 361/724 |
| 8,644,015 B2* | 2/2014 | Lin | G06F 1/187 | 361/679.33 |
| 8,730,661 B2* | 5/2014 | Lai | G11B 33/08 | 361/679.33 |
| 8,879,271 B2* | 11/2014 | Fan | H05K 7/1489 | 361/679.33 |
| 8,947,860 B2* | 2/2015 | Snider | H05K 9/0079 | 455/344 |
| 9,265,171 B1* | 2/2016 | Szeremeta | G11B 33/08 | |
| 9,558,789 B1* | 1/2017 | Van Pelt | G06F 1/187 | |
| 9,785,205 B2* | 10/2017 | Lien | G06F 1/187 | |
| 9,886,069 B2* | 2/2018 | Moore | G06F 1/187 | |
| 9,958,912 B2* | 5/2018 | Chen | G11B 33/124 | |
| 10,228,734 B1* | 3/2019 | Hsieh | G06F 1/187 | |
| 10,354,697 B1* | 7/2019 | Zhang | G11B 33/025 | |
| 10,534,411 B2* | 1/2020 | Spencer | G06F 1/187 | |
| 10,772,229 B2* | 9/2020 | Boeckmann | H05K 7/1401 | |
| 10,803,907 B2* | 10/2020 | Schroeder | G11B 33/128 | |
| 10,976,786 B2* | 4/2021 | Wang | G11B 33/123 | |
| 11,490,533 B2* | 11/2022 | Song | G11B 33/124 | |
| 2002/0051338 A1* | 5/2002 | Jiang | G06F 1/20 | 248/633 |
| 2002/0101713 A1* | 8/2002 | Eland | G06F 1/187 | 361/679.42 |
| 2007/0279886 A1* | 12/2007 | Grady | G06F 1/188 | 361/809 |
| 2009/0129009 A1* | 5/2009 | Zhang | G11B 33/124 | 361/679.34 |
| 2009/0167124 A1* | 7/2009 | Lee | G06F 1/187 | 312/223.2 |
| 2012/0092824 A1 | 4/2012 | Thijssen et al. | | |
| 2013/0015317 A1* | 1/2013 | Huang | G11B 33/08 | 248/636 |
| 2013/0063876 A1 | 3/2013 | Pakula et al. | | |
| 2020/0097054 A1 | 3/2020 | Lin et al. | | |

\* cited by examiner

DRIVE CARRIER WITH IN-MOLDED SCREW PLATE

INTRODUCTION

Some computing devices are configured to receive pluggable media drives, which are removably plugged into receptacles or "bays" in the computing device. The media drives may comprise, for example, solid state drives ("SSDs"), hard disk drives ("HDDs"), or other media drives. In some systems, drive carriers may be coupled to the media drive to facilitate installation and uninstallation of the media drives. The drive carries comprise structures that partially surround the media drives and are coupled thereto so as to support and partially house the media drives. The drive carriers may comprise various features that aid installation, uninstallation, and general use of the drives, such as: a latch to secure the drive in the bay, an actuation mechanism (e.g., handle) to unlatch the drive from the bay, electromagnetic interference (EMI) shielding features, indicator elements (e.g., light pipes), and so on.

BRIEF DESCRIPTION OF THE DRAWINGS

The present disclosure can be understood from the following detailed description, either alone or together with the accompanying drawings. The drawings are included to provide a further understanding of the present disclosure and are incorporated in and constitute a part of this specification. The drawings illustrate one or more examples of the present teachings and together with the description explain certain principles and operation. In the drawings.

DETAILED DESCRIPTION

Figure 1:
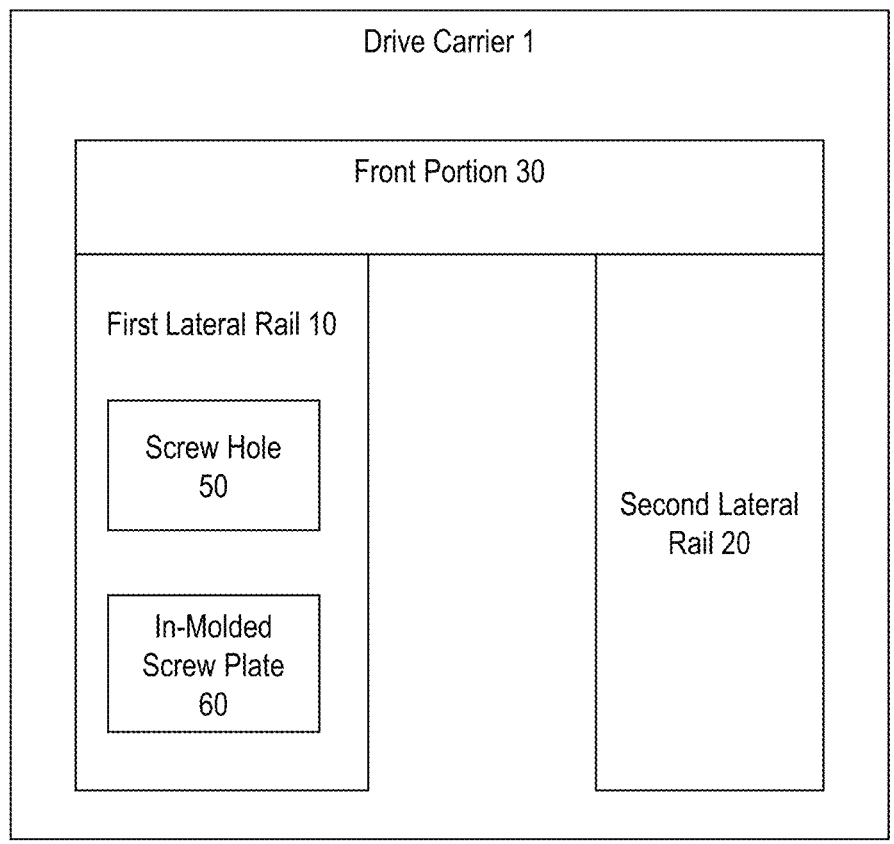
FIG. 1 is a block diagram illustrating an example drive carrier.

The size and shape of a drive carrier is largely defined by the physical form of the media drive they are configured to carry. These forms are generally standardized by industry standards/specifications. For example, a family of standards entitled Enterprise & Data Center Standard Form Factors (EDSFF) defines a number of form factors for SSDs used in data centers or other enterprise-grade servers. EDSFF standards define specifications such as the physical dimensions and electrical interfaces of the storage devices. Examples of the EDSFF family of standards include, but are not limited to, SFF-TA-1006, SFF-TA-1007, or SFF-TA-1008.

Generally, form factors for media drives are getting smaller and smaller. For example, the emergent EDSFF standards specify form factors such as the E1.S form factor which has drives that are as little as 31.5 mm wide and 5.0 mm tall, and the E3.S form factor which comprises drives that are as little 76.0 mm wide and 7.5 mm tall. The drive carriers that are designed to carrier such small drives also necessarily have relatively small dimensions. In addition, the desire to include more of these drives within a given space in a computing system dictates that drive carriers be as small as possible. In particular, one dimension that has become very small in some drive carriers is the thickness dimension of the lateral rails of the carrier that extend along the lateral sides of the drive. For example, in some drive carriers designed to support EDSFF drives (referred to herein as EDSFF drive carriers), the lateral rails of the drive carrier may be very thin, such as 1.45 mm. Moreover, the lateral rails are generally coupled to the drive via retention screws, and to avoid interference with insertion of the drive into a bay the heads of these screws may be recessed within the thickness of the lateral rails (e.g., the screw hole may be countersunk to allow the head of the screw to sit level with, or below, a face of the lateral rail). Given the already very small thickness of the lateral rails, the remaining material below the countersunk head of the screw can be extremely thin, for example between 1.19 mm near a periphery of the head to as low as 0.55 mm nearer the center of the head.

In some EDSFF drive carriers, at least one of these lateral rails is formed from a relatively light and low-cost material such as plastic, to reduce weight and the overall cost of the drive. But due to the thinness of the plastic material in the lateral rail, especially in the region around the screw hole mentioned above, the retention screws that extends through the lateral rail to attach the lateral rail to the drive may cause the plastic around the hole to crack and the screw may tear through the screw hole. More specifically, because of the thinness of the rail, a flat-head screw may need to be used, and such screws tend to generate hoop stress on the surrounding material. But because the plastic material in this region is so thin, the hoop stress may cause the plastic to fail.

To address these and other issues, examples disclosed herein provide a drive carrier for carrying a media drive (e.g., an EDSFF drive carrier) that comprises a plastic lateral rail with an in-molded screw plate positioned at the through hole in the plastic lateral rail through which the retention screw is to be inserted. The in-molded screw plate comprises a relatively strong material, such as a metal (e.g., steel, zinc, aluminum, etc.). The screw plate has a hole therein configured to align with the hole in the plastic and to receive the threaded section of the screw while preventing the screw head from passing therethrough. The in-molded screw plate provides structural support to the thin plastic in the rim around the hole and thus reduces the risk of cracking. Moreover, in the event that cracking does occur, the screw plate can nevertheless prevent the screw head from completely tearing through the hole. In addition, in examples that utilize the screw plate, the majority of the lateral rail is still made from the relatively cost effective and light weight plastic material, and thus the advantages of this plastic material are largely retained in examples disclosed herein while at least the above-noted disadvantages thereof are mitigated by the screw plate.

In some examples, the in-molded screw plate comprises various features that facilitate its in-molding into the drive carrier or otherwise improve the performance of the screw plate. For example, the in-molded screw plate may comprise wings or bent portions at opposite ends thereof which extend at an angle from a central portion of the screw plate. These wings may provide a structural feature for the plastic to flow around, allowing plastic to hold onto both sides of the plate and thus better secure the screw plate to the plastic. In particular, the very thin dimensions of the lateral rail, coupled with the thickness of the screw head countersunk there, may result in there being very little room beneath the screw head in which to dispose the screw plate. As a result, a rear face of the screw plate may be very near, or in some cases essentially coplanar with, a rear face of the lateral rail. Therefore, if the plate were completely flat, there may be a risk that the rear side of the plate will not be covered by plastic (or if covered, is very thinly covered). In other words, the positioning of the plate would result in the plate being very shallowly disposed in, and not surrounded by, plastic. This may allow the plate to be relatively easily dislodged from the lateral rail. However, with the plate having wings that are bent inward towards a center of the lateral rail, some space is opened up on the rear side of the plate (near the wings) and the plastic can flow around the wings into this space and contact both a front and a rear face of the plate (at least in the region around the wings), giving the plastic much more to hold onto. In other words, the wings allow at least a portion of the plate to be embedded in and surrounded by the plastic.

Another feature that may be included in some examples is plastic-flow-through holes in the aforementioned wings. These plastic-flow-through holes may allow plastic to more easily flow through and around the wings during the molding process. IN addition, the plastic-flow-through holes may allow for the plastic to have a stronger hold on the screw plate. These and other features are described in greater detail below with reference to the figures.

FIG. 1 comprise a block diagram schematically illustrating an example drive carrier 1. The drive carrier 1 may be, for example, an EDSFF drive carrier configured to carry an EDSFF drive, such as an E3.S drive for example. The drive carrier 1 comprises a front portion 30, a first lateral rail 10, and a second lateral rail 20. The front portion 30 is coupled to the first and second lateral rails 10 and 20 to form a frame having the shape of three sides of a rectangle, with the frame dimensioned so to receive a media drive between the first and second lateral rails 10 and 20.

The first lateral rail 10 is made of plastic and has a screw hole 50 formed therein to allow a retention screw to be inserted therethrough to secure the drive carrier 1 to a drive mounted therein. The first lateral rail 10 further comprises an in-molded screw plate 60. The screw plate 60 is positioned within the plastic of the first lateral rail 10 surrounding the screw hole 50. The screw plate 60 comprises a metal (e.g., steel, zinc, aluminum, etc.) and has a screw passthrough therein that is aligned with the screw hole 50. The screw plate 60 may provide structural support to the thin plastic surrounding the rim of the screw hole 50, thus helping to keep a screw from cracking the plastic or tearing through the first lateral rail 10.

In various examples, the screw plate 60 may have additional features, such as wings, alignment holes, plastic-flow-through holes, and reinforcements for the wings. These features are all described below in relation to one example of the screw plate that happens to have all of these features together, but it should be understood that these features could be included separately, or in any desired combination, in various examples of the screw plate 60.

Turning now, to FIGS. 2-13, another example of a drive carrier 100 will be described in greater detail. Drive carrier 100 is one example configuration of the drive carrier 1 illustrated in FIG. 1.

Figure 2:
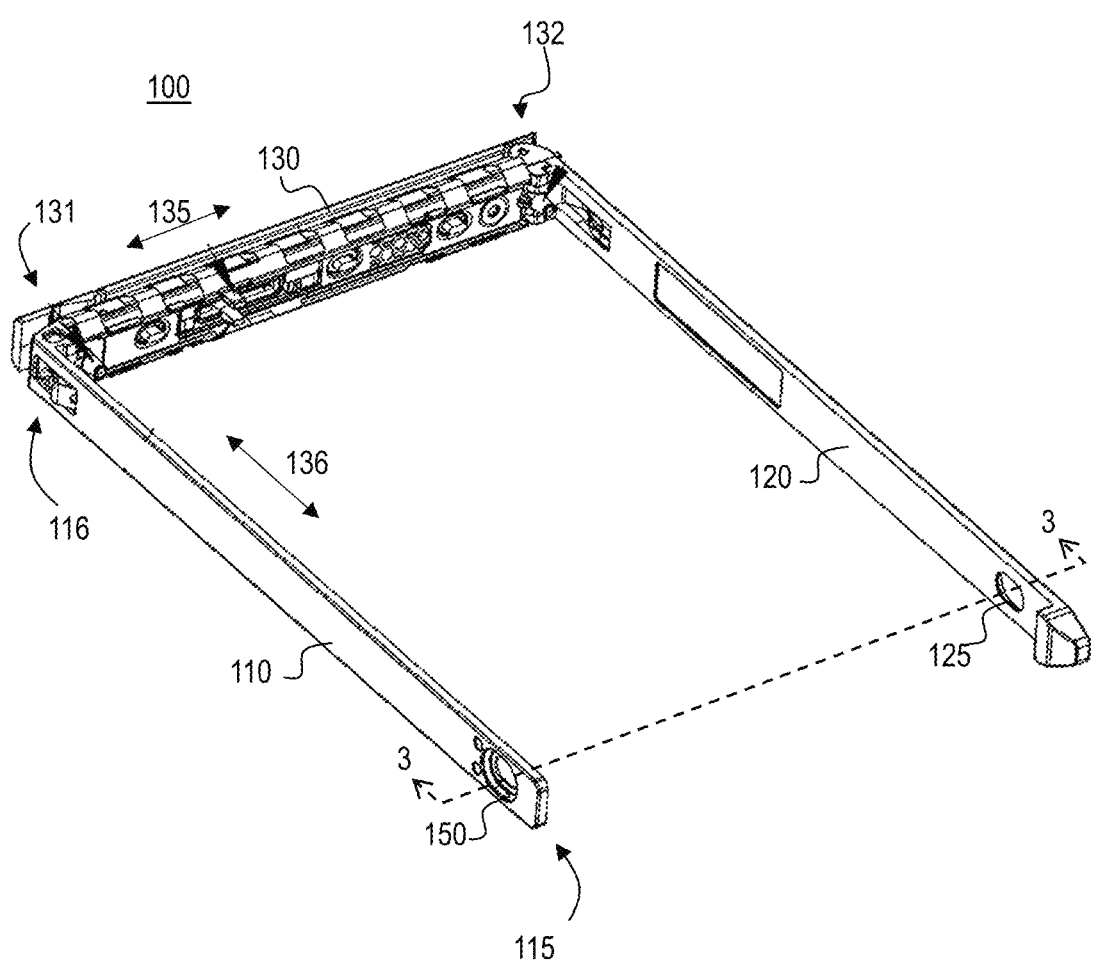
FIG. 2 is a perspective view of another example drive carrier.

FIGS. 2-5 illustrate an example drive carrier 100. The drive carrier 100 may be, for example, an EDSFF drive carrier configured to carry an EDSFF drive, such as an E3.S drive for example. As shown in FIG. 2, the drive carrier 100 comprises a front portion 130, a first lateral rail 110, and a second lateral rail 120. The front portion 130 extends along a first direction 135. The first lateral rail 110 extends from a first side 131 of the front portion 130 along a second direction 136, perpendicular to the first direction 135. The second lateral rail 120 extends from a second side 132 of the front portion 130 parallel to the second direction 136. Thus, the front portion 130 and lateral rails 110 and 120 together form a frame having a shape corresponding to three sides of a rectangle, which is dimensioned to receive an EDSFF drive 50 between the lateral rails 110 and 120 as shown in FIG. 3A.

Figure 3A:
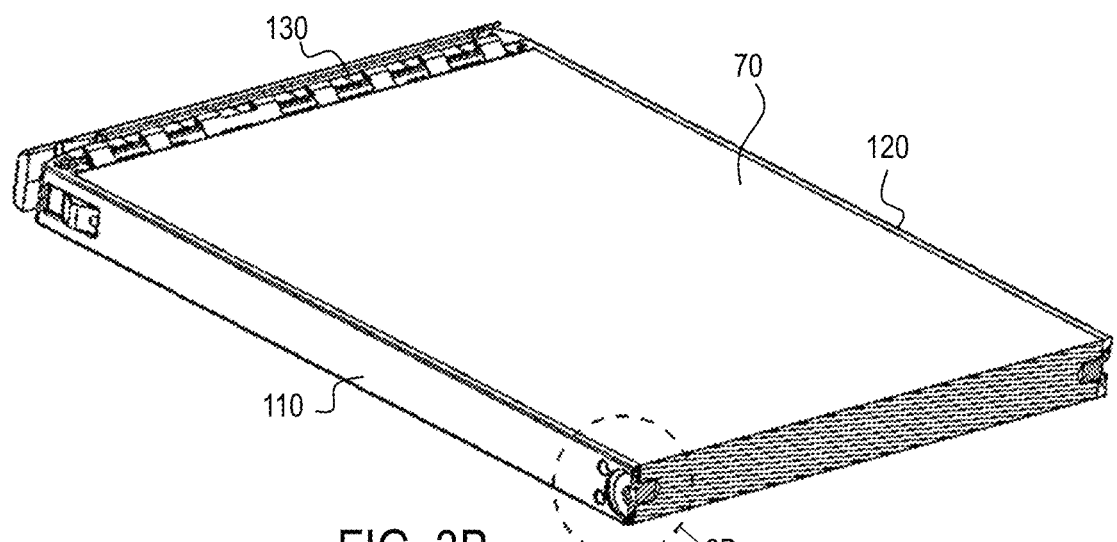
FIG. 3A is a perspective sectional view of the example drive carrier with drive mounted thereto, with section taken along 3-3 in FIG. 2.
Figure 3B:
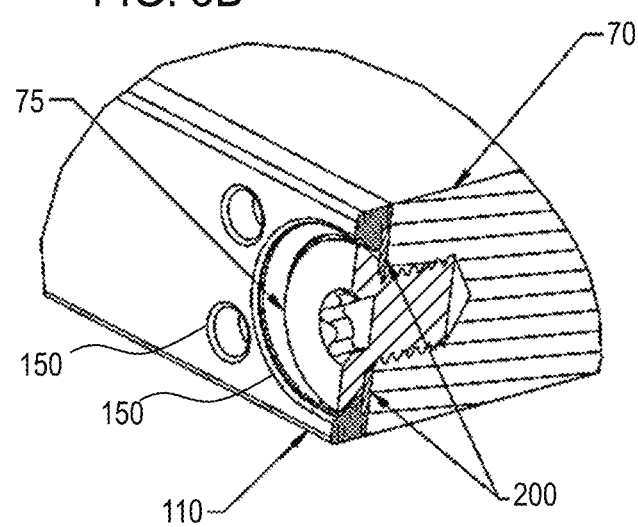
FIG. 3B is an enlarged detail view of the region 2B in FIG. 3A.
Figure 4:
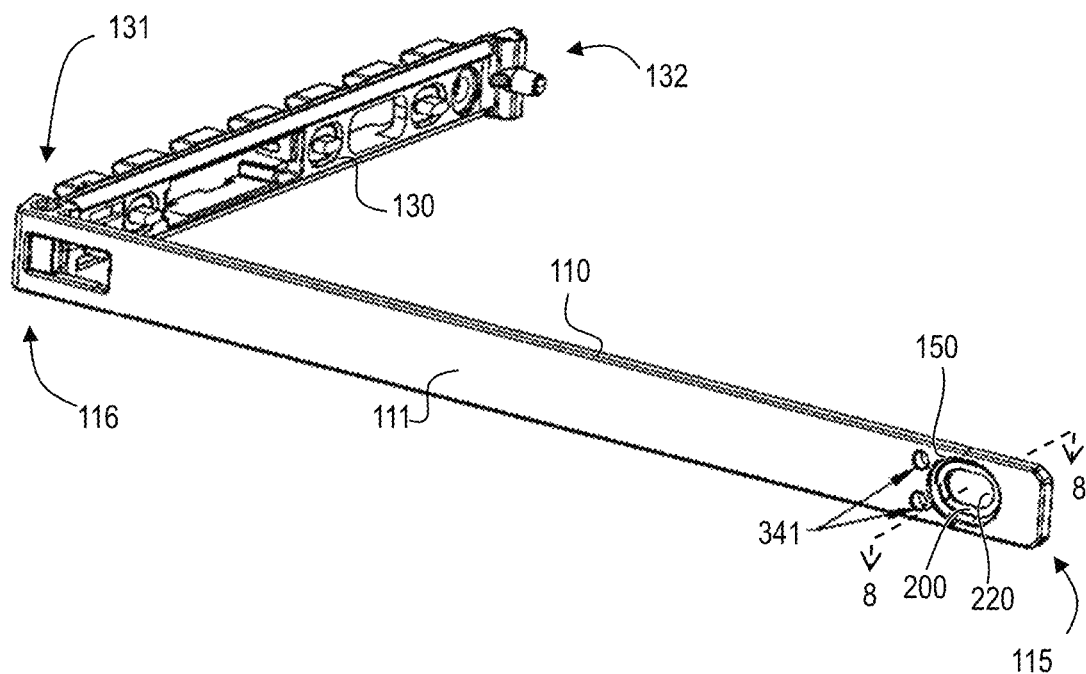
FIG. 4 is a perspective view of a portion of the drive carrier of FIG. 2 showing an outer face of a first lateral rail.
Figure 5:
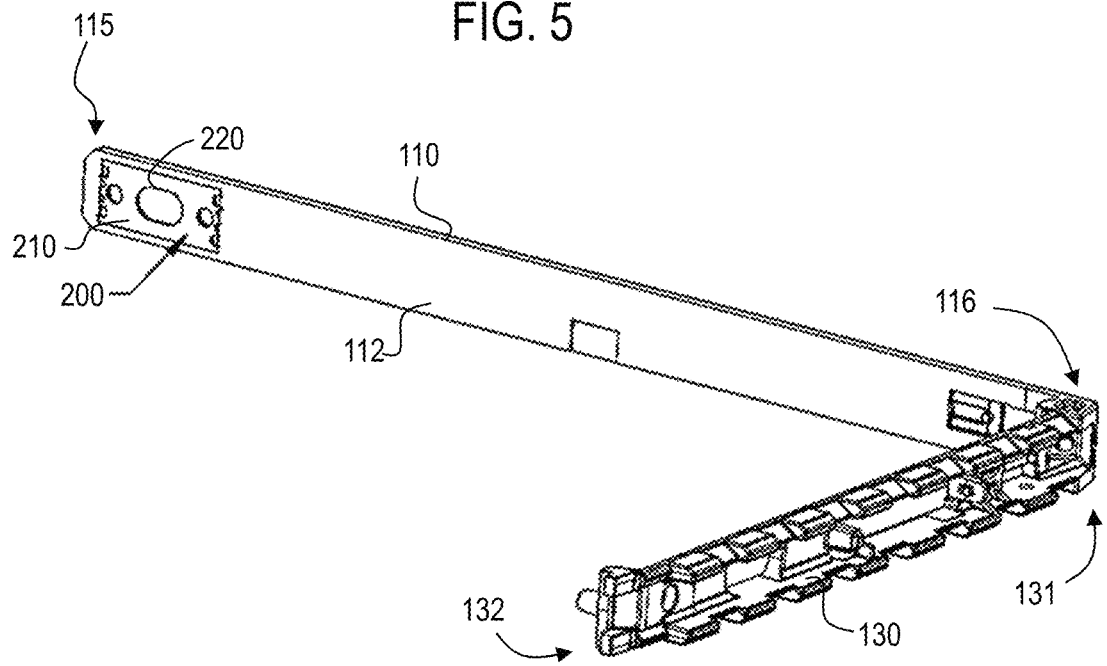
FIG. 5 is another perspective view of the portion of the drive carrier of FIG. 4 showing an inner face of the first lateral rail.

As shown in FIG. 2, the first lateral rail 110 comprises a screw hole 150. As shown in FIGS. 3A and 3B, the screw hole 150 is configured to receive a retention screw 75, which engages a threaded hole in a drive 70 positioned within the drive carrier 100, thus securing the drive 70 to the drive carrier 100. As shown in FIGS. 2 and 4, the screw hole 150 is positioned near a distal end 115 of the first lateral rail 110, opposite from a proximal end 116 of the first lateral rail 110 that is coupled to the frame. The media drive 70 may comprise, for example, an SSD. In some examples, the media drive 70 comprises an EDSFF SSD. In some examples, the media drive comprises an EDSFF SSD of one of the E.3 form factors. In some cases, the drive carrier 100 is provided (e.g., manufactured, sold, etc.) separately from the drive 70, and some examples of this disclosure comprise such drive carriers 100 without the drives 70 being present. In other cases, the drive carrier 100 and the media drive 70 may be provided together as an assembly (such as in FIG. 3A), referred to herein as a drive carrier assembly, and some examples of this disclosure comprise such an assembly. In the assembled state of the drive carrier assembly, the media drive 70 is carried by (mounted to) the drive carrier 100 and secured thereto by screws 75 through the screw holes 150 and/or 125.

The first lateral rail 110 may be formed from a relatively light and inexpensive material, such as plastic. Thus, as described above, to support the material around the screw hole 150 and prevent cracking and tear out of the screw 75, the first lateral rail 110 may have an in-molded screw plate 200 formed therein surrounding the screw hole 150, as shown in FIGS. 3B, 4, 5, and 8. The screw plate 200 is described in greater detail below.

In some examples, the second lateral rail 120 may be formed from a more robust material, such as a metal (e.g., die-cast zinc). Thus, in such examples a screw hole 125 in the second lateral rail 120 does not need an in-molded screw plate. In other examples, the second lateral rail 120 may also be formed from plastic, and in such examples (not illustrated) the second lateral rail 120 may also comprise an in-molded screw plate similar to the screw plate 200.

Figure 6:
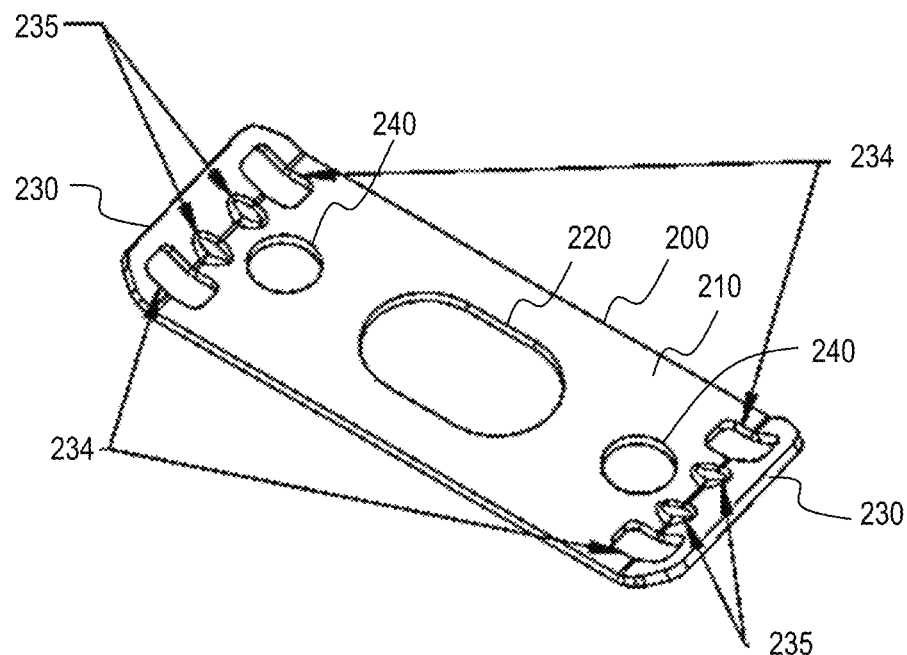
FIG. 6 is a perspective view of a screw plate of the drive carrier of FIG. 2 showing a first side of the screw plate.
Figure 7:
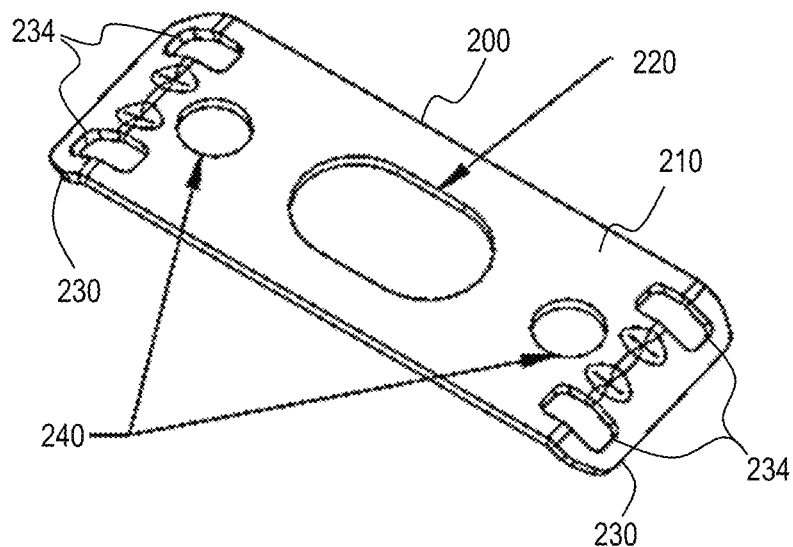
FIG. 7 is another perspective view of the screw plate of the drive carrier of FIG. 6 showing a second side of the screw plate.

As shown in FIGS. 6 and 7, the in-molded screw plate 200 comprises a central portion 210 that is relatively flat and two wing portions 230 at opposite ends of the central portion 210. The wing portions 230 are bent at an angle relative to the central portion 210. The wing portions 230 also may comprise reinforcements 235, such as embossments, to increase rigidity and aid in maintaining the orientation of the wing portion 230. The screw plate 200 may be formed from a metal, such as steel, aluminum, zinc, or any other metal.

Figure 8:
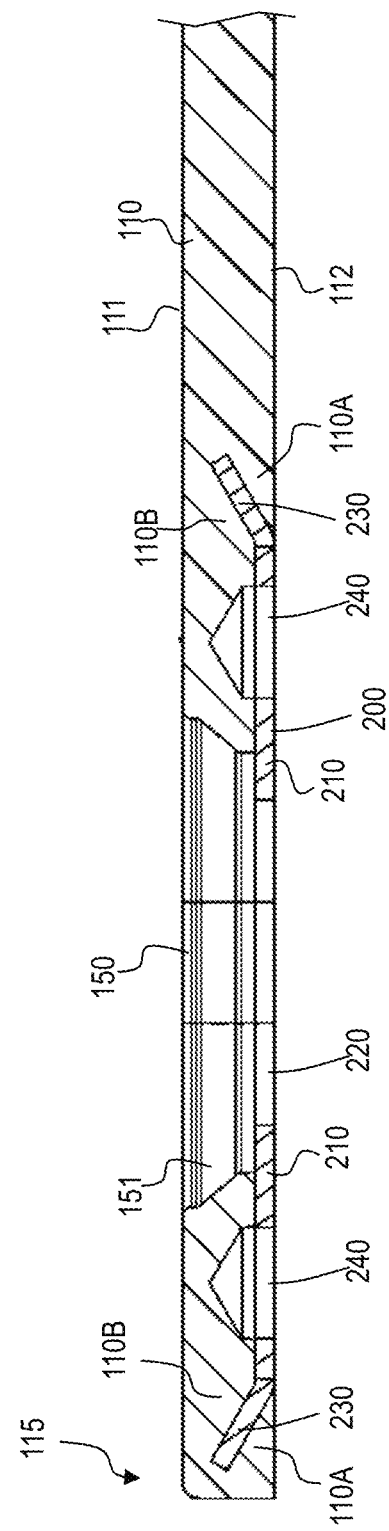
FIG. 8 is cross-section of the first lateral rail of the drive carrier of FIG. 2, with the section taken along 8-8 in FIG. 4.

As shown in the cross-section of FIG. 8, when the plate 200 is molded into the first lateral rail 110, the central portion 210 is positioned near (e.g., level with) an inner face 112 of the first lateral rail 110 (the inner face 112 being the face that is adjacent the media drive 70 when assembled), and the wing portions 230 are angled away from the inner face 112 towards the outer face 111. As a result, plastic of the first lateral rail 110 is positioned on both sides of the wings 130, including a first portion 110A of the plastic positioned on one side of the wings 230 and a second portion 110B of the plastic positioned on an opposite side of the wings 130. Thus, the wings 230 are embedded within and completely surrounded by the plastic, allowing the first lateral rail 110 to grasp and hold the screw plate 200. This helps to secure the screw plate 200 in the first lateral rail 110. In the illustrated example, two wings 230 are provided, one on each opposite end of the plate 200, but in other examples a single wing 230 may be provided. In addition, similar wings (not illustrated) may also be provided at the other edges (e.g., the longitudinal edges) of the plate 200 in some examples, in addition to or in lieu of the wings 230 that are positioned at the short edges of the plate 200.

In contrast, if the screw plate 200 were completely flat (without wings 230), then in some cases only a rear face and side edges of the screw plate 200 may be in contact with the plastic, but plastic might not be positioned on both sides of the screw plate 200 (or only a very thin layer may be present on one side, in some cases). In such a case, the screw plate 200 might not be held very strongly by the plastic, and could come loose. One reason why it might not be feasible to position the screw plate 200 closer to a center of the first lateral rail 110 to ensure sufficient plastic is positioned on both sides thereof is that, in some cases, the head of the screw 75 may occupy most of the thickness of the first lateral rail 110, because the first lateral rail 110 is so thin, and thus to avoid interference with the head of the screw 75 the screw plate 200 may need to be positioned closer to the inner face 112. The head of the screw 75 is positioned inside the thickness of the first lateral rail 110 so that the screw 75 sits level with or lower than the outer face 111 to allow clearance for insertion/removal of the drive carrier from a computing system. Thus, as shown in FIG. 8, the screw hole 150 may include a sloped countersink portion 151 to accommodate the head of the screw 75, which leaves very little (in some cases no) remaining thickness within which the screw plate 200 may be disposed. The wings 230, however, allow the screw plate 200 to be disposed near (e.g., level with) the inner face 112 while still being securely embedded within the first lateral rail 110.

Moreover, as shown in FIGS. 6 and 7, the wings 230 comprise plastic-flow-through holes 234. These holes 234 allow plastic to flow through the wings 230 during a molding process. This can help to ensure that the plastic can fully surround the wings 230. In particular, without the holes 234, some of the portions 110A of plastic on a rear side of the wings 230 might not be filled with plastic, due to the small dimensions and relatively acute angle of the wings 230. However, with the holes 234 the plastic can more easily flow all around the wings 230. In addition, the holes 234 allow for the portions 110A of the plastic on one side of the wings 230 to at least partially connect with the portions 110B of plastic on the other side of the wings 230 through the holes 234, and this connection to the portion 110B through the holes 234 may act like a tie or strap that helps to hold the portions 110A in place, reducing the risk that the plate 200 can be pulled free from the first lateral rail 110 by deforming/displacing the portions 110A of plastic. In some examples, the plastic-flow-through holes 234 straddle or span the bend that joins the wings 230 to the central portion 210, with a portion of each hole 234 being in the central portion 210 and another portion of each hole 234 being in one of the wings 230.

As shown in FIGS. 6 and 7, the screw plate 200 also comprises a screw passthrough 220, and as shown in FIGS. 4 and 8 the screw passthrough 220 of the screw plate 200 is aligned with the screw hole 150 of the first lateral rail 110. However, the screw passthrough 220 is smaller than a head of the screw 75, and thus prevents the head from pulling through the first lateral rail 110. As shown in FIG. 8, the screw hole 150 comprises an angled-countersink portion 151 configured to receive the head of the screw 75 when installed, allowing the head of the screw 75 to not protrude past the outer surface 111. In the assembled state, that the flat head screw 75 will bottom out on the screw plate 200. That is, as can be seen in FIG. 3B, a portion of the head of the screw 75 may contact the screw plate 200 around the rim of the screw passthrough 220. This contact between screw 75 and screw plate 200 controls the positioning of the head of the screw 75 relative to the lateral rail 110 such that there is a slight clearance between the screw head and the sloped countersink portion 151. In other words, the screw 75 does not contact the plastic of the lateral rail 110 (assuming ideal tolerances). Thus, the hoop stress that otherwise would have been imposed by the flat-head screw on the plastic is avoided entirely. Moreover, even in cases in which the tolerances add up such that some intermittent contact is made between the screw 75 and the plastic in the angled-countersink portion 151, any hoop stress generated is much smaller and less likely to crack the plastic than without the screw plate 200.

Figure 9:
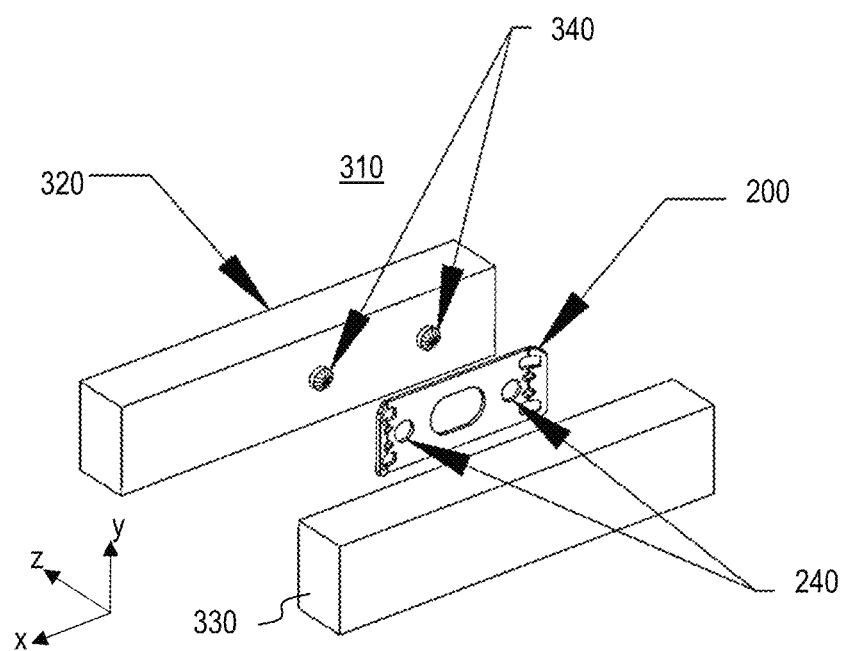
FIG. 9 is an exploded perspective view of a portion of a mold showing alignment pins.
Figure 10:
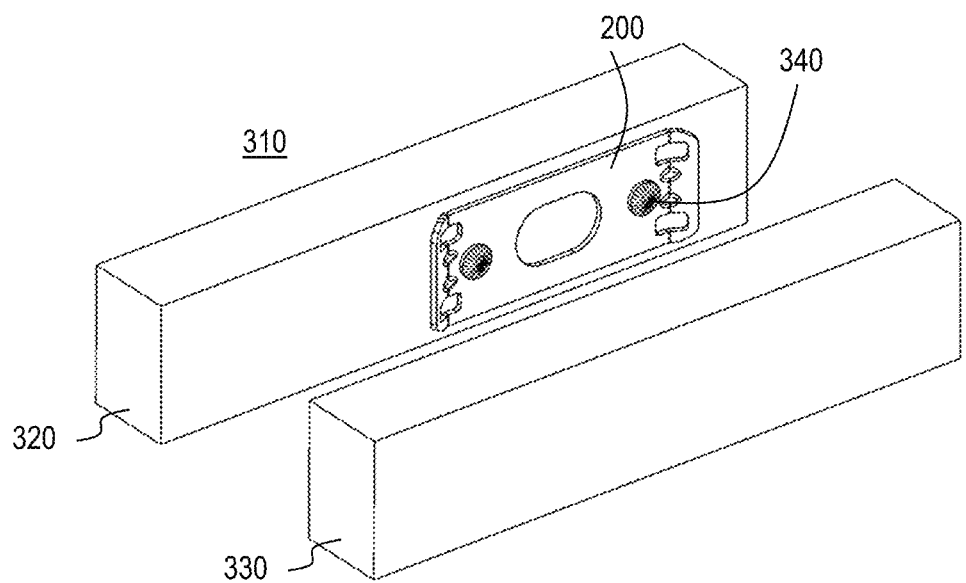
FIG. 10 is another exploded perspective view of the portion of the mold of FIG. 9 showing screw plate mounted on the alignment pins.

As shown in FIGS. 6 and 7, the screw plate 200 may also comprise alignment holes 240. As shown in FIGS. 9, 10 and 13, these alignment holes 240 may mate with corresponding alignment pins 340 positioned in a first wall 320 of the mold 310 that is used to the mold the first lateral rail 110. The pins 340 align the screw plate 200 in the proper position in the first lateral rail 110. In particular, the engagement of the alignment pins 340 with the alignment holes 240 fixes the position of the screw plate 200 in the x and y directions illustrated in FIG. 9, and the engagement between the plate 220, the first wall 320, and anti-float pins 350 (described below) fixes the position of the screw plate 200 in the z-direction illustrated in FIG. 9. In this way, the screw plate 200 can be precisely positioned in the relatively thin first lateral rail 110. Moreover, the pins 340 hold the plate 200 in this position throughout the molding process. (Note that in FIGS. 9-12 the walls 320 and 330 of the mold 310 are shown in exploded form, but during molding the walls 320 and 330 would be much closer together, as shown in FIG. 13).

Figure 11:
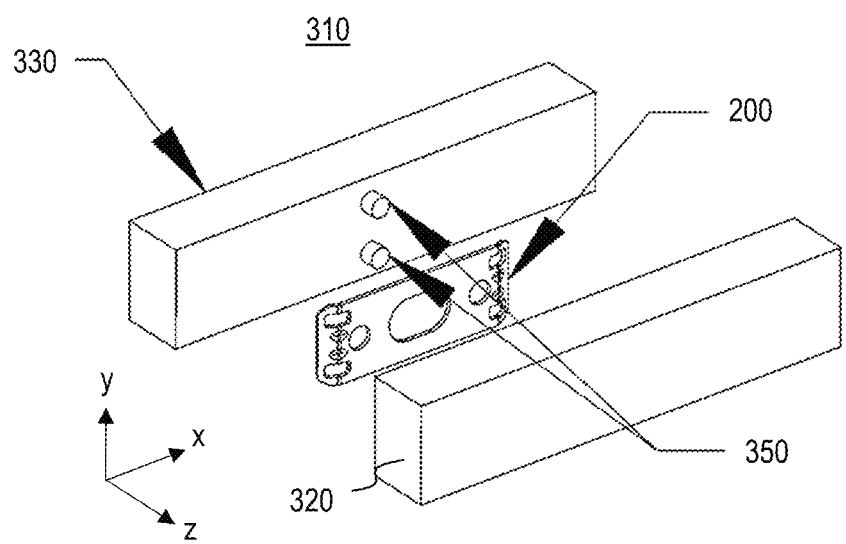
FIG. 11 is another exploded perspective view of the portion of the mold of FIG. 9 showing anti-float pins.
Figure 12:
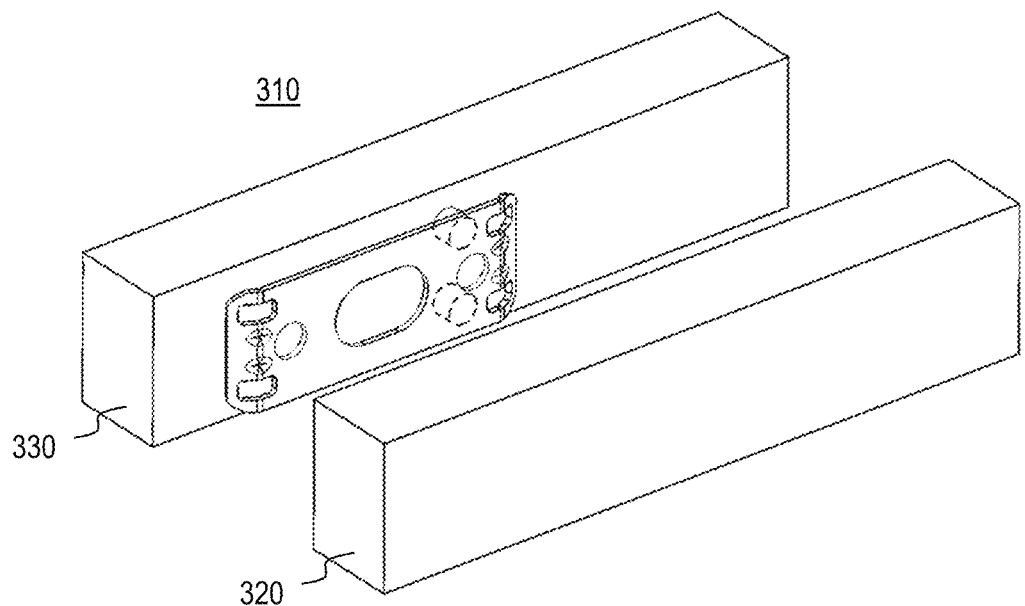
FIG. 12 is another exploded perspective view of the portion of the mold of FIG. 11 showing the anti-float pins engaging the screw plate.
Figure 13:
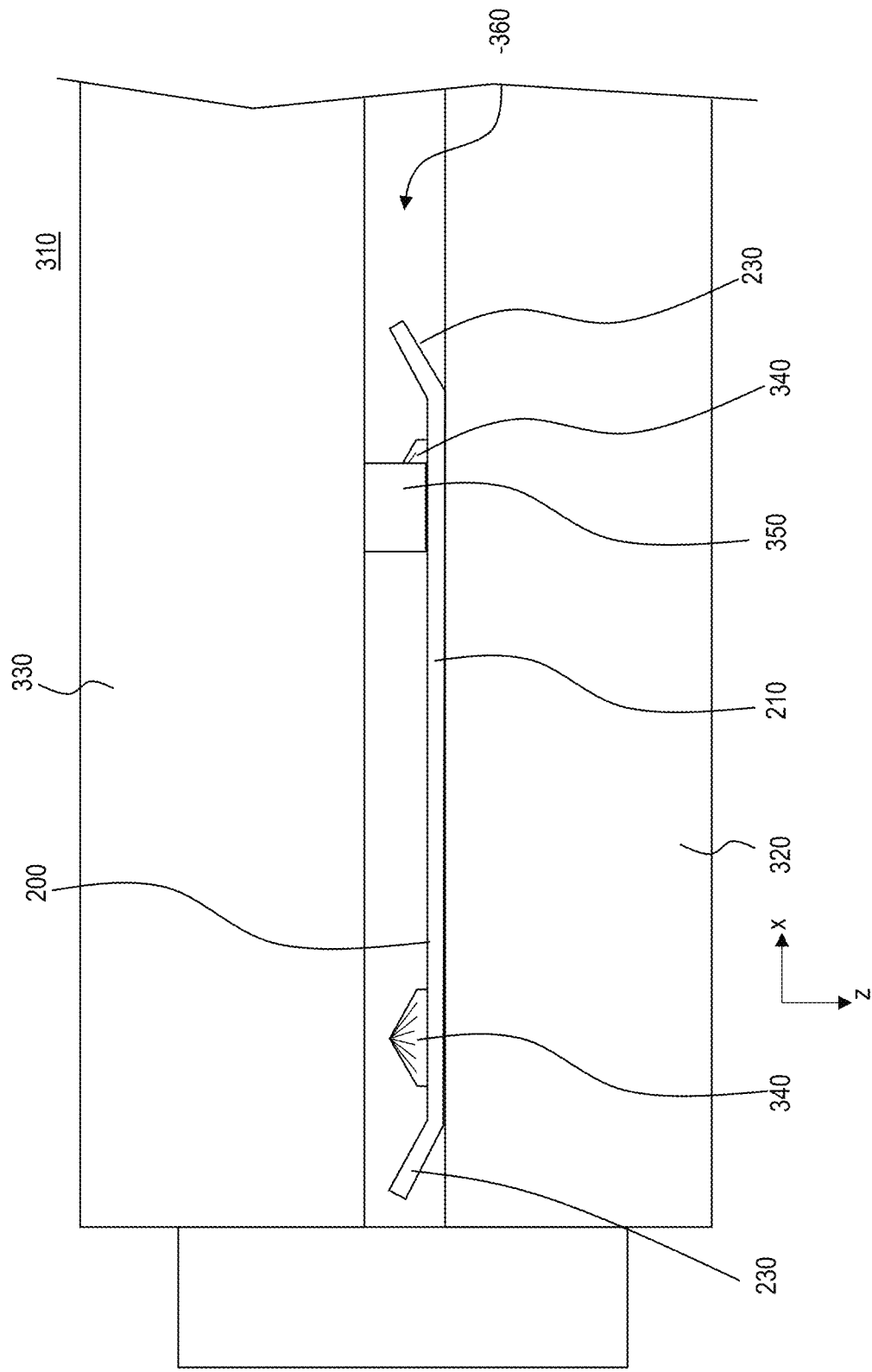
FIG. 13 is a top view of the mold of FIG. 9 showing screw plate mounted on the alignment pins and anti-float pins engaging the screw plate.

As shown in FIGS. 11-13, the second wall 330 of the mold 310 that is opposite from the alignment pins 340 may also comprise anti-float pins 350. The anti-float pins 350 may contact the screw plate 200 when the screw plate 200 is installed on the alignment pins 240 and the walls 320 and 330 are brought together for the molding process, as shown in FIG. 13. This prevents the screw plate 200 from lifting off from the alignment pins 340 prior to or during the molding, for example due to being buffeted by the molten plastic. As shown in FIG. 4, after the molding process when the walls 320 and 330 are removed, the anti-float pins 340 may leave behind holes 341 in the outer surface 111 of the first lateral rail 110, which may extend through to the plate 200.

As shown in FIG. 13, when the walls 320 and 330 of the mold 310 are brought together with the plate 200 installed on the alignment pins 240, a cavity 360 is formed therein that has the desired shape and dimensions of the first lateral rail 110. This cavity 360 is then filled with molten plastic. The plate 200 is positioned within the cavity 360, and thus the molten plastic flows around the plate 200 and as the plastic hardens the plate 200 is embedded (in-molded) therein. Because the plate is in contact with the wall 320, a rear surface of the plate 200 may not be covered by plastic (or may be only thinly covered). However, as shown in FIG. 13, the wings 230 protrude into the cavity 360 and thus can be surrounded by and embedded in the plastic (moreover, the plastic flow-through openings 234 help ensure plastic flows easily all around the wings 230).

With the in-molded screw plate 200 formed in the first lateral rail 110, the screw 75 is now much less likely to crack the thin plastic around the rim of the screw hole 150. In particular, while the flat head screw still does generate substantial hoop stress on this region, the stronger screw plate 200 can lend structural support to the plastic and help it resist cracking. Moreover, even if the plastic does crack, the screw plate 200 can still prevent the screw 75 from being pulled through the screw hole 150 by interference between the head of the screw 75 and the rim of the hole 220 in the plate 200.

Figure 14:
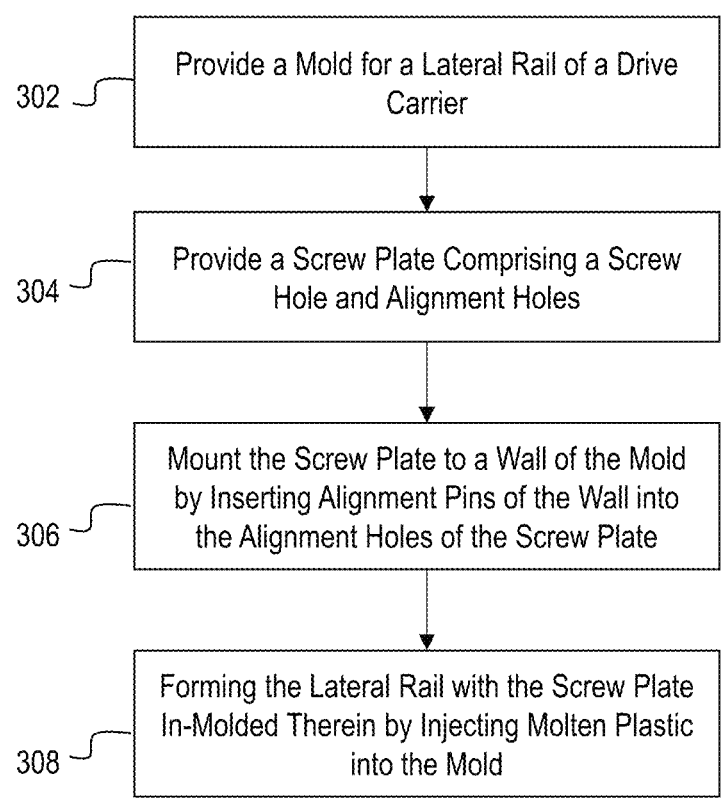
FIG. 14 is a process flow diagram illustrating an example method.

Turning now to FIG. 14, an example method 300 will now be described. The method 300 begins with block 302. Block 302 comprises providing a mold for a lateral rail of a drive carrier. Providing an item as used herein may include forming (e.g., manufacturing, assembling, etc.) the item or taking control/possession of the item (e.g., purchasing the item formed by someone else). For example, the mold may comprise walls that define a cavity, wherein the cavity has the dimensions of the lateral rail. In some examples, the lateral rail may be for an EDSFF drive carrier. The mold may comprise alignment pins coupled to a first wall thereof and anti-float pins on a second wall thereof, opposite the first wall.

Block 304 comprises providing a screw plate comprising a screw passthrough and alignment holes. The screw plate may be made from a metal material. The screw plate may comprise a flat central portion, and in some examples may also comprise wings at opposite ends of the central portion that are bent at an angle relative to the central portion.

Block 306 comprises mounting the screw plate to a first wall of the mold by inserting alignment pins coupled to the first wall into the alignment holes of the screw plate. In some examples, block 306 further comprises engaging a first side of the screw plate with the first wall and engaging a second side of the screw plate with anti-float pins coupled to a second wall of the mold.

Block 308 comprises forming the lateral rail with the screw plate in-molded therein by injecting molten plastic into the mold, while the screw plate is held by the alignment pins. In some examples, block 308 may further comprise holding the screw plate on the alignment pins by engaging anti-float pins on a second wall of the mold with the screw plate. In some examples, forming the lateral rail may include using the mold to form a screw hole (e.g., screw hole 150) in the lateral rail, with the screw hole being aligned with the screw passthrough of the screw plate. In such examples, the screw hole may be formed by the presence of a protrusion (not illustrated) from one of the walls of the mold that corresponds in size and shape to the screw hole, wherein the protrusion blocks the plastic from filing the space that will become the screw hole. In some examples, block 308 may further comprise separating the walls of the mold to free the lateral rail therefrom. In some examples, rather than the screw hole being formed in the molding, block 308 may further comprise, after freeing the lateral rail from the mold, machining (e.g., drilling) the screw hole into the lateral rail at a position aligned with the screw passthrough of the screw plate.

Figure 15:
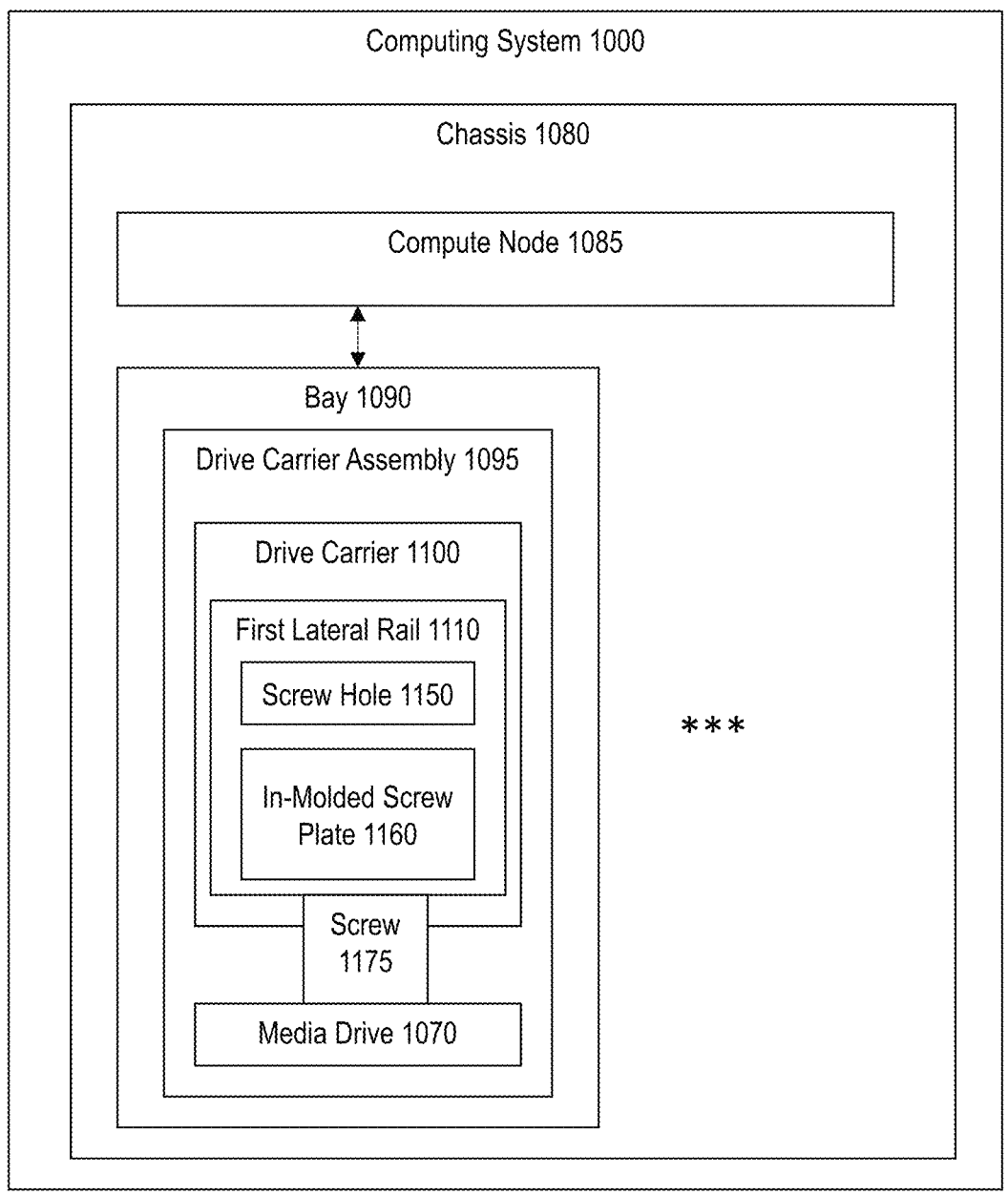
FIG. 15 is a block diagram illustrating an example computing system.

Turning now to FIG. 15, an example computing system 1000 is described. The computing system 1000 comprises a system chassis 1080, which may form a housing that contains the other components of the computing system 1000. The computing system 1000 also comprises one or more compute nodes 1085. The compute nodes 1085 may be, for example, servers (server nodes, sever trays, blade severs, etc.), storage controllers, modular compute and/or storage appliances (e.g., hyperconverged systems), networking elements that comprise processing capabilities, or any other electronic device with processing capabilities.

The computing system 1000 further comprises one or more bays 1090. Only one bay 1090 is shown, but the other bays 1090 (if present) may be similar. In some examples, a plurality of bays 1090 are present. Each bay 1090 is configured to removably receive a corresponding drive carrier assembly 1095. In FIG. 15, a single drive carrier assembly 1095 is shown in an installed state in a bay 1090, but in some examples there are a plurality of drive carrier assemblies 1095 (e.g., up to one per bay 1090) and in some examples the drive carrier assemblies 1095 are not necessarily in the installed state at any given time (because the drive carrier assemblies 1095 are removable).

The drive carrier assemblies 1095 comprise a drive carrier 1100 and a media drive 1070 that is carried by (mounted to) the drive carrier 1100. The drive carrier 1100 comprises at least a first lateral rail 1110, which is formed of plastic. The first lateral rail 1110 comprises a screw hole 1150 and a metal screw plate 1160 in-molded into the plastic of the first lateral rail 1110 and surrounding the screw hole 1150. A screw 1175 extends through the screw hole 1150 and through the screw plate 1160 to engage with the media drive 1070 and secure the media drive 1070 to the first lateral rail 1110.

The drive carrier 1100 may also comprise other components, such as a front portion and a second lateral rail, as has already been described above in relation to the FIGS. 1-5, and thus duplicative description of these parts is omitted. In particular, in some examples the drive carrier 1100 comprises the drive carrier 1 described above, and in some examples the drive carrier 1100 comprises the drive carrier 100 described above. The screw plate 1160 may, in some examples, comprise any of the features described above in relation to the screw plate 200, individually or in any combination, but duplicative description of these features is omitted. In some examples, the screw plate 1160 comprises the screw plate 200.

In FIG. 15, the drive carrier assembly 1095 is shown as part of the computing system 1000. However, in some cases the drive carrier assembly 1095 is provided (manufactured, sold, etc.) on its own, separately from the computing system in which it is going to be used, and some examples herein comprise such drive carrier assemblies 1095 separate from the computing system 1000. Other examples disclosed herein comprise the computing system 1000 together with one or more of the drive carrier assemblies 1095, as shown in FIG. 15.

Each bay 1090 comprises electrical connectors (not illustrated) that electrically connect corresponding connectors of the media drive 1050. The electrical connectors of each bay 1090 are coupled to other components of the computing system 1000, including the compute node 1080, thus allowing for communication of electrical signals between the media drives 1050 and the compute nodes 1080 or other components. The bay 1090 may be configured to facility blind-mate connections with the media drive 1050. In particular, the bays 1090 may include alignment and/or guide features, such as rails, slots, or other features (not illustrated), that engage with a drive carrier 1100 of the drive carrier assembly 1095 to guide the drive carrier assembly 1095 into an installed position in which connectors of the media drive 1050 are aligned with and connected to the connectors of the bay 1090. The drive carrier 1100 may include a latch (not illustrated) to secure the drive carrier assembly 1095 in the bay 1090 once installed.

It is to be understood that both the general description and the detailed description provide examples that are explanatory in nature and are intended to provide an understanding of the present disclosure without limiting the scope of the present disclosure. Various mechanical, compositional, structural, electronic, and operational changes may be made without departing from the scope of this description and the claims. In some instances, well-known circuits, structures, and techniques have not been shown or described in detail in order not to obscure the examples. Like numbers in two or more figures represent the same or similar elements.

In addition, the singular forms "a", "an", and "the" are intended to include the plural forms as well, unless the context indicates otherwise. Moreover, the terms "comprises", "comprising", "includes", and the like specify the presence of stated features, steps, operations, elements, and/or components but do not preclude the presence or addition of one or more other features, steps, operations, elements, components, and/or groups. Components described as coupled may be electronically or mechanically directly coupled, or they may be indirectly coupled via one or more intermediate components, unless specifically noted otherwise. Mathematical and geometric terms are not necessarily intended to be used in accordance with their strict definitions unless the context of the description indicates otherwise, because a person having ordinary skill in the art would understand that, for example, a substantially similar element that functions in a substantially similar way could easily fall within the scope of a descriptive term even though the term also has a strict definition.

And/or: Occasionally the phrase "and/or" is used herein in conjunction with a list of items. This phrase means that any combination of items in the list—from a single item to all of the items and any permutation in between—may be included. Thus, for example, "A, B, and/or C" means "one of {A}, {B}, {C}, {A, B}, {A, C}, {C, B}, and {A, C, B}".

Elements and their associated aspects that are described in detail with reference to one example may, whenever practical, be included in other examples in which they are not specifically shown or described. For example, if an element is described in detail with reference to one example and is not described with reference to a second example, the element may nevertheless be claimed as included in the second example.

Unless otherwise noted herein or implied by the context, when terms of approximation such as "substantially," "approximately," "about," "around," "roughly," and the like, are used, this should be understood as meaning that mathematical exactitude is not required and that instead a range of variation is being referred to that includes but is not strictly limited to the stated value, property, or relationship. In particular, in addition to any ranges explicitly stated herein (if any), the range of variation implied by the usage of such a term of approximation includes at least any inconsequential variations and also those variations that are typical in the relevant art for the type of item in question due to manufacturing or other tolerances. In any case, the range of variation may include at least values that are within +1% of the stated value, property, or relationship unless indicated otherwise.

Further modifications and alternative examples will be apparent to those of ordinary skill in the art in view of the disclosure herein. For example, the devices and methods may include additional components or steps that were omitted from the diagrams and description for clarity of operation. Accordingly, this description is to be construed as illustrative only and is for the purpose of teaching those skilled in the art the general manner of carrying out the present teachings. It is to be understood that the various examples shown and described herein are to be taken as exemplary. Elements and materials, and arrangements of those elements and materials, may be substituted for those illustrated and described herein, parts and processes may be reversed, and certain features of the present teachings may be utilized independently, all as would be apparent to one skilled in the art after having the benefit of the description herein. Changes may be made in the elements described herein without departing from the scope of the present teachings and following claims.

It is to be understood that the particular examples set forth herein are non-limiting, and modifications to structure, dimensions, materials, and methodologies may be made without departing from the scope of the present teachings.

Other examples in accordance with the present disclosure will be apparent to those skilled in the art from consideration of the specification and practice of the invention disclosed herein. It is intended that the specification and examples be considered as exemplary only, with the following claims being entitled to their fullest breadth, including equivalents, under the applicable law.

What is claimed is:

1. A drive carrier, comprising:
   a front portion;
   a first lateral rail extending from the front portion, wherein the first lateral rail is formed from plastic and comprises a screw hole;
   a second lateral rail extending from the front portion, wherein the front portion, the first lateral rail, and the second lateral rail form a frame configured to receive a media drive between the first and second lateral rails with the media drive being coupled to the first lateral rail by a screw inserted through the screw hole; and a metal screw plate in-molded into the first lateral rail around the screw hole.

2. The drive carrier of claim 1,
wherein the screw plate comprises a central portion and one or more wings at ends of the central portion, the wings being bent at an angle relative to the central portion.

3. The drive carrier of claim 2,
wherein the first lateral rail comprises an inner face that faces the second lateral rail and an outer face that faces opposite from the inner face; and
wherein the central portion of the screw plate is positioned adjacent the inner face and the wings extend toward the outer face.

4. The drive carrier of claim 2,
wherein the wings are embedded in the plastic that forms the first lateral rail with plastic completely surrounding the wings.

5. The drive carrier of claim 2,
wherein the screw plate comprises plastic-flow-through holes at the wings.

6. The drive carrier of claim 5,
wherein the plastic that forms the first lateral rail extends through the plastic-flow-through holes such that a first portion of the plastic on a first side of the screw plate is joined to a second portion of the plastic on a second side of the screw plate via the plastic-flow-through holes.

7. The drive carrier of claim 5,
wherein each of the plastic-flow-through holes spans a bend that joins one of the wings to the central portion such that a portion of each plastic-flow-through hole is in the central portion and another portion of each plastic-flow-through hole is in one of the wings.

8. The drive carrier of claim 5,
wherein the screw plate comprises two of the wings and each of the wings comprises at least two of the plastic-flow-through holes.

9. The drive carrier of claim 5,
wherein the screw plate comprises, for each of the wings, one or more reinforcements at a bend joining the respective wing to the central portion.

10. The drive carrier of claim 1,
wherein the screw plate comprises two alignment holes configured to engage with complementary alignment pins of a mold that formed the first lateral rail to align the screw plate relative to the mold during a molding process.

11. The drive carrier of claim 10,
wherein the first lateral rail comprises one or more holes in an outer face of the first lateral rail formed by anti-float pins of the mold that engaged with the screw plate while the screw plate was engaged with the alignment pins during the molding process.

12. The drive carrier of claim 1,
wherein the screw plate comprises a screw passthrough that is aligned with the screw hole of the first lateral rail.

13. The drive carrier of claim 1,
wherein the screw passthrough has a smaller area than the screw hole.

14. A drive carrier assembly, comprising:
the drive carrier of claim 1;
a media drive received within the drive carrier between the first lateral rail and the second lateral rail; and
a retention screw inserted through the screw hole and through the screw plate into the media drive and coupling the media drive to the first lateral rail.

15. A computing system, comprising:
a system chassis comprising one or more bays configured to removably receive drive carrier assemblies, respectively;
a drive carrier assembly received within, or configured to be receivable in, one of the bays, wherein the drive carrier assembly comprises:
drive carrier of claim 1;
a media drive received within the drive carrier between the first lateral rail and the second lateral rail; and
a retention screw inserted through the screw hole and through the screw plate into the media drive and coupling the media drive to the first lateral rail.

16. A computing system, comprising:
a system chassis comprising a plurality of bays configured to removably receive drive carrier assemblies, respectively;
a compute node housed in the system chassis;
a plurality of a drive carrier assemblies received within the bays, respectively, wherein each of the drive carrier assembly comprises:
a drive carrier comprising at least a first lateral rail formed from plastic and comprising a screw hole, and a metal screw plate in-molded into the first lateral rail surrounding the screw hole; and
a media drive secured to the drive carrier by a screw inserted through the screw hole;
wherein each of the media drives is communicably connected to the compute node.

17. The computing system of claim 16,
wherein the screw plate comprises wherein the screw plate comprises a central portion and one or more wings at ends of the central portion, the wings being bent at an angle relative to the central portion.

* * * * *